US012627127B2

(12) United States Patent
Izawa et al.

(10) Patent No.: US 12,627,127 B2
(45) Date of Patent: May 12, 2026

(54) WIRE HARNESS

(71) Applicant: SUMITOMO WIRING SYSTEMS, LTD., Yokkaichi (JP)

(72) Inventors: Katsutoshi Izawa, Yokkaichi (JP); Kosuke Tanaka, Yokkaichi (JP); Ryuta Saito, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 370 days.

(21) Appl. No.: 18/255,689

(22) PCT Filed: Nov. 30, 2021

(86) PCT No.: PCT/JP2021/043853
§ 371 (c)(1),
(2) Date: Jun. 2, 2023

(87) PCT Pub. No.: WO2022/130963
PCT Pub. Date: Jun. 23, 2022

(65) Prior Publication Data
US 2024/0372345 A1     Nov. 7, 2024

(30) Foreign Application Priority Data

Dec. 18, 2020     (JP) ................................. 2020-210636

(51) Int. Cl.
| | |
|---|---|
| *H02G 3/04* | (2006.01) |
| *B60R 16/02* | (2006.01) |
| *H01B 7/00* | (2006.01) |

(52) U.S. Cl.
CPC ....... *H02G 3/0468* (2013.01); *B60R 16/0215* (2013.01); *H01B 7/0045* (2013.01)

(58) Field of Classification Search
CPC .. H02G 3/04; H02G 3/30; H02G 3/32; H02G 3/0418; H02G 3/0462; H02G 3/0481; B60R 6/0207; B60R 6/0215; B60R 16/0468; H01B 7/0045
See application file for complete search history.

(56) References Cited

U.S. PATENT DOCUMENTS

| | | | | |
|---|---|---|---|---|
| D264,682 S | * | 6/1982 | Van Doren | .................... D8/354 |
| 5,160,105 A | * | 11/1992 | Miller | ................... A47C 7/002 |
| | | | | 248/188.9 |
| D380,145 S | * | 6/1997 | Rumpel | ........................ D8/395 |

(Continued)

FOREIGN PATENT DOCUMENTS

| | | |
|---|---|---|
| JP | 2013-74747 A | 4/2013 |

OTHER PUBLICATIONS

Jan. 11, 2022 International Search Report issued in International Patent Application No. PCT/JP2021/043853.

*Primary Examiner* — Paresh Paghadal

(74) *Attorney, Agent, or Firm* — Oliff PLC

(57) ABSTRACT

A wire harness including: a wire; an exterior tube that is tubular and covers an outer circumference of the wire; and a route restrictor that is attached to an outer circumference of the exterior tube, and is configured to restrict a route of the exterior tube, wherein: the exterior tube includes a linear portion, and a corrugated portion that is continuous from the (Continued)

linear portion, the corrugated portion has a higher bendability than the linear portion, and the route restrictor is attached to the linear portion.

11 Claims, 6 Drawing Sheets

(56) References Cited

U.S. PATENT DOCUMENTS

| | | | | |
|---|---|---|---|---|
| 5,829,483 | A * | 11/1998 | Tukahara | F16L 9/18 |
| | | | | 138/121 |
| 7,456,361 | B2 * | 11/2008 | Hill | H01R 4/646 |
| | | | | 248/74.2 |
| 7,721,396 | B2 * | 5/2010 | Fleischman | A47C 1/14 |
| | | | | 248/74.2 |
| 9,616,826 | B2 * | 4/2017 | Inao | H02G 3/32 |
| 9,871,360 | B2 * | 1/2018 | Nakai | H02G 3/0481 |
| 2004/0107533 | A1 * | 6/2004 | Nishihara | H02G 11/00 |
| | | | | 16/2.1 |
| 2004/0187947 | A1 * | 9/2004 | Heo | F16L 11/122 |
| | | | | 138/121 |
| 2008/0116324 | A1 * | 5/2008 | Holder | F16L 3/1226 |
| | | | | 248/65 |
| 2013/0140054 | A1 * | 6/2013 | Kato | H02G 1/00 |
| | | | | 174/68.3 |
| 2014/0110011 | A1 * | 4/2014 | Omura | H02G 3/0468 |
| | | | | 264/249 |
| 2014/0196929 | A1 | 7/2014 | Okuhara | |
| 2015/0041210 | A1 | 2/2015 | Inao et al. | |
| 2015/0114680 | A1 * | 4/2015 | Inao | H02G 3/32 |
| | | | | 174/102 R |
| 2015/0136483 | A1 * | 5/2015 | Inao | H02G 3/0481 |
| | | | | 174/72 A |
| 2015/0179300 | A1 * | 6/2015 | Inao | H02G 3/0487 |
| | | | | 174/68.3 |
| 2016/0049777 | A1 * | 2/2016 | Anselmo | H10F 99/00 |
| | | | | 248/49 |
| 2016/0101746 | A1 * | 4/2016 | Inao | B60R 16/0215 |
| | | | | 174/72 A |
| 2016/0214550 | A1 | 7/2016 | Oga et al. | |
| 2017/0129424 | A1 * | 5/2017 | Nagahashi | H01B 7/0045 |
| 2017/0355328 | A1 * | 12/2017 | Nagashima | H01B 7/0045 |
| 2018/0248346 | A1 * | 8/2018 | Yoshida | H02G 3/0468 |
| 2019/0351846 | A1 * | 11/2019 | Matsuyama | B60R 16/0215 |
| 2020/0274343 | A1 * | 8/2020 | Sugino | H02G 3/34 |

* cited by examiner

WIRE HARNESS

BACKGROUND

The present disclosure relates to a wire harness.

Conventionally, wire harnesses are known that include: a corrugated tube in a corrugated shape serving as an exterior member that covers an outer circumference of a wire member; and a route restricting member that covers part of the corrugated tube in a circumferential direction and restricts a route in which the wire member is routed (see, for example, JP 2013-55760A).

The corrugated tube of the wire harness disclosed in JP 2013-55760A has a slit extending in a length direction. The route restricting member includes a route maintaining member provided along an outer circumference of the corrugated tube, and an attachment member provided in the slit. The attachment member is engageable with both an inner circumferential portion of the slit and an outer circumferential portion of the route maintaining member. By winding and fixing the corrugated tube, the route maintaining member, and the attachment member with tape, the route of the wire member is restricted. Such a wire harness has a configuration in which the route is restricted at a position at which the route restricting member is attached so that the wire member is not bent, and the wire member is easily bendable at a position at which no route restricting member is provided. With this, for example, the wire harness installed in a vehicle can be prevented from being suspended at the position at which the route restricting member is attached. Also, for example, when installing the wire harness in the vehicle, an operator can suitably bend the wire harness at the position at which no route restricting member is provided, and install the bent wire harness.

SUMMARY

However, in the above-described wire harness, the exterior member is a corrugated tube in a corrugated shape and is bendable in its entirety in the longitudinal direction, and thus, for example, the route restricting member needs to have a sufficient thickness in order to achieve sufficient route restriction. There is a demand for a wire harness with a simple configuration that can partially achieve sufficient route restriction, and is partially bendable.

An exemplary aspect of the disclosure provides a wire harness that can realize both favorable route restriction and bendability.

According to the present disclosure, a wire harness includes: a wire; an exterior tube that is tubular and covers an outer circumference of the wire; and a route restrictor that is attached to an outer circumference of the exterior tube, and is configured to restrict a route of the exterior tube, wherein: the exterior tube includes a linear portion, and a corrugated portion that is continuous from the linear portion, the corrugated portion has a higher bendability than the linear portion, the route restrictor includes: a body that covers part of an outer circumference of the exterior tube in a circumferential direction; and an insertion hole that is formed by two ends of the body in the circumferential direction, and extends in a length direction of the route restrictor over an entire length of the route restrictor, the insertion hole being an opening into which the exterior tube is insertable, and the route restrictor is attached to the linear portion.

According to the wire harness of the present disclosure, it is possible to realize both favorable route restriction and bendability.

DETAILED DESCRIPTION OF EMBODIMENTS

Description of Embodiments of Present Disclosure

Figure 1:
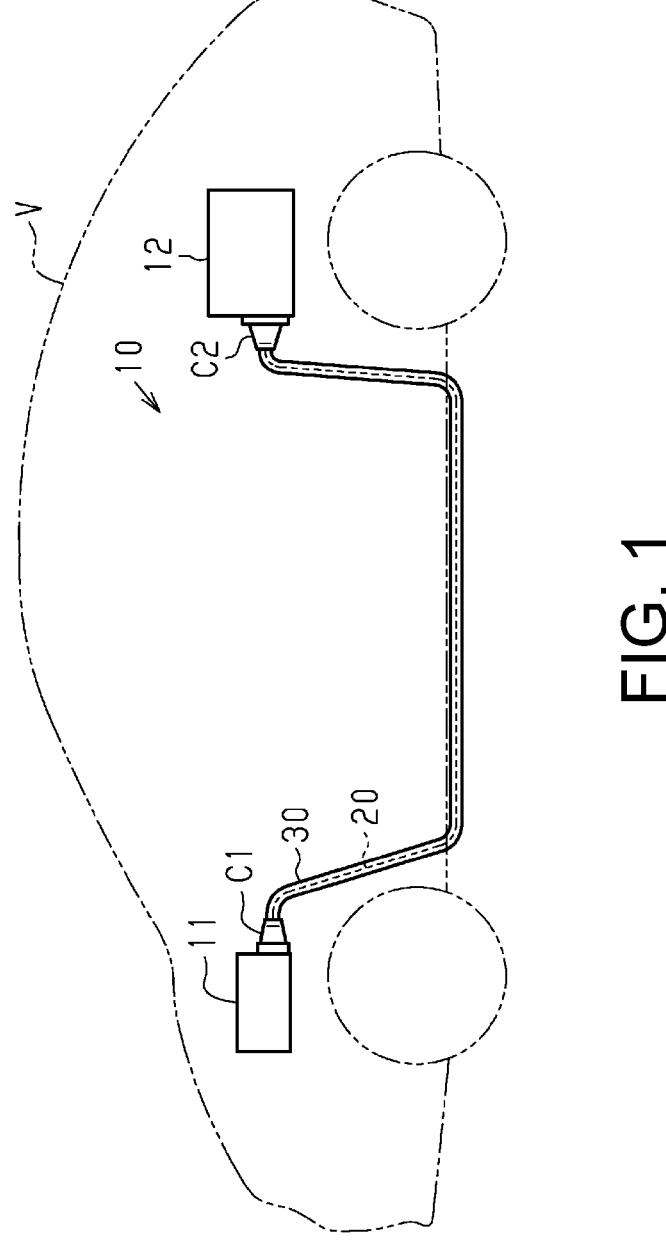
FIG. 1 is a diagram schematically illustrating a configuration of a wire harness according to an embodiment.

First, embodiments of the present disclosure will be listed and described.

According to the present disclosure, a wire harness includes:

[1] a wire member; an exterior member that is tubular and covers an outer circumference of the wire member; and a route restricting member that is attached to an outer circumference of the exterior member, and is configured to restrict a route of the exterior member, wherein the exterior member includes a linear portion, and a corrugated portion that is continuous from the linear portion, the corrugated portion is superior in bendability to the linear portion, the route restricting member includes: a body portion that covers part of the exterior member in a circumferential direction, out of the outer circumference of the exterior member; and an insertion hole that is formed by two ends of the body portion in a circumferential direction, and extends in the length direction of the route restricting member over the entire length of the route restricting member, the insertion hole being an opening into which the exterior member is insertable, and the route restricting member is attached to the linear portion.

According to this configuration, since the exterior member includes the linear portion, and the corrugated portion that is continuous from the linear portion and is superior in bendability to the linear portion, the exterior member is unlikely to bend at the linear portion and is likely to bend at the corrugated portion. Also, since the route restricting member is attached to the linear portion, non-bendability of the linear portion is complemented even when the exterior member is made thin in view of the bendability of the corrugated portion, and sufficient route restriction in the linear portion can be achieved. In this configuration, it is possible to achieve a reduction in thickness of the route restricting member and realize sufficient route restriction at the same time, compared to a case where the route restricting member is attached to a corrugated tube whose entire shape is corrugated, for example. Also, in a configuration in which no route restricting member is provided and a linear portion with enhanced rigidity is used to achieve sufficient route restriction, there is a risk that the corrugated portion is unlikely to bend or likely to be damaged. However, the above-described configuration can avoid such a situation and ensure the bendability of the corrugated portion. With this, it is possible to realize both favorable route restriction and bendability.

[2] Preferably, the linear portion has an outer diameter that is smaller than an outer diameter of the corrugated portion.

According to this configuration, since the outer diameter of the linear portion is smaller than the outer diameter of the corrugated portion, it is possible to reduce the outer diameter of the portion to which the route restricting member is attached, compared with a case where the outer diameter of the linear portion is greater than or equal to the outer diameter of the corrugated portion.

[3] Preferably, the route restricting member has a length that is shorter than a length of the linear portion.

According to this configuration, since the route restricting member has a length that is shorter than a length of the linear portion, it is possible to attach the route restricting member over its entire length to the linear portion.

[4] Preferably, the route restricting member attached to the linear portion has an outer diameter that is smaller than or equal to the outer diameter of the corrugated portion.

According to this configuration, since the outer diameter of the route restricting member attached to the linear portion is smaller than or equal to the outer diameter of the corrugated portion, the portion to which the route restricting member is attached is prevented from protruding from the corrugated portion in the radial direction.

[5] Preferably, the body portion is major arc-shaped.

According to this configuration, since the body portion of the route restricting member is major arc-shaped, it is possible to retrofit the route restricting member to the outer circumference of the exterior member via the insertion hole, without using any fixation member such as tape, for example.

[6] Preferably, the route restricting member has projections that respectively project toward the exterior member from inner surfaces of the two ends of the body portion in the circumferential direction, and are in contact with an outer surface of the exterior member.

According to this configuration, since the route restricting member has projections that respectively project toward the exterior member from inner surfaces of the two ends of the body portion in the circumferential direction, and are in contact with an outer surface of the exterior member, it is possible to prevent the route restricting member from being removed from the exterior member via the insertion hole.

[7] Preferably, the linear portion has a recess into which each of the projections is fitted.

According to this configuration, since the linear portion has a recess into which each of the projections is fitted, it is possible to prevent more efficiently the route restricting member from being removed from the exterior member via the insertion hole. Also, it is possible to suppress the route restricting member from rotating in the circumferential direction with respect to the linear portion. Also, it is possible to reduce the outer diameter of the portion to which the route restricting member is attached. Also, the linear portion is less likely to bend, compared with a configuration in which no recess is provided.

[8] Preferably, two of the recesses are provided.

According to this configuration, since two of the recesses are provided, it is possible to bring the protrusions at the two ends of the body portion in the circumferential direction into a state of being fitted into the respective recesses. Accordingly, it is possible to suppress the route restricting member from being removed from the exterior member via the insertion hole more efficiently than in a case where one recess is provided. Also, it is possible to further suppress the route restricting member from rotating in the circumferential direction with respect to the linear portion. Also, it is possible to further reduce the outer diameter of the portion to which the route restricting member is attached. Also, the linear portion is much less likely to bend.

[9] Preferably, three or more of the recesses are provided.

According to this configuration, since three or more of the recesses are provided, it is possible to change the position in the circumferential direction at which the route restricting member is attached to the linear portion. Also, the linear portion is much less likely to bend, compared with a configuration in which at most two recesses are provided.

[10] Preferably, the body portion is minor arc-shaped.

According to this configuration, since the body portion of the route restricting member is minor arc-shaped, the shape is simplified.

[11] Preferably, a coupling member is provided that is annular surrounding the outer circumference of the exterior member, and extends over a boundary between the linear portion and the corrugated portion.

According to this configuration, since the coupling member is provided that is annular surrounding the outer circumference of the exterior member, and extends the boundary between the linear portion and the corrugated portion, it is possible to prevent a bend at the boundary between the linear portion and the corrugated portion. That is to say, there is a risk that a bend occurs at the boundary between the linear portion and the corrugated portion due to a change in the structure, but such a bend is prevented by the coupling member.

[12] Preferably, a corrugated portion route restricting member is provided that is attached to the outer circumference of the corrugated portion, and configured to restrict a route of the corrugated portion, wherein the coupling member covers the outer circumference of the exterior member and an outer circumference of the corrugated portion route restricting member, and couples the exterior member to the corrugated portion route restricting member.

According to this configuration, the route of the corrugated portion is restricted by the corrugated portion route restricting member. Since the coupling member surrounds the outer circumference of the exterior member and the outer circumference of the corrugated portion route restricting member and couples the exterior member to the corrugated portion route restricting member, the coupling member is a member that fixes the corrugated portion route restricting member to the exterior member, and serves at the same time as a member that prevents a bend at the boundary between the linear portion and the corrugated portion.

[13] Preferably, the coupling member extends over a space between the route restricting member and the corrugated portion route restricting member, and surrounds the outer circumference of the route restricting member.

According to this configuration, since the coupling member extends over the space between the route restricting member and the corrugated portion route restricting member, and surrounds the outer circumference of the route restricting member, the exterior member is suppressed from bending at a position between the route restricting member and the corrugated portion route restricting member.

[14] Preferably, the corrugated portion route restricting member includes a first engagement portion, which is a protrusion protruding in a radial direction of the exterior member or a recess formed in the exterior member in the radial direction, and the coupling member includes: a second engagement portion that engages with the first engagement portion in a manner of recess/protrusion engagement; and a protrusion that protrudes toward the insertion hole and is located inside the insertion hole.

According to this configuration, since the coupling member includes the second engagement portion that engages with the first engagement portion of the corrugated portion route restricting member in a manner of recess/protrusion engagement, and the protrusion that is located inside the insertion hole of the route restricting member, it is possible to suppress the corrugated portion route restricting member from rotating in the circumferential direction with respect to the route restricting member.

Detail of Embodiments of Present Disclosure

The following will describe specific examples of the wire harness of the present disclosure with reference to the drawings. In the drawings, part of a configuration may be exaggerated or simplified, for ease of description. Furthermore, dimensions of constituent components may be scaled differently between the drawings. Note that the present disclosure is not limited to these examples but is defined by the claims, and all modifications within the meaning and scope equivalent to the claims are intended to be included. In the context of the present specification, the term "orthogonal" includes not only exactly orthogonal, but also substantially orthogonal to the extent that the functions and effects of the embodiments are achieved. Also, the terms "circle" and "arc" in the present specification include not only exact circle and arc, but also approximate circle and arc to the extent that the functions and effects of the embodiments are achieved.

Overall Configuration of Wire Harness 10

The wire harness 10 shown in FIG. 1 electrically connects at least two or three electrical devices to each other. The wire harness 10 electrically connects, for example, an inverter 11 disposed in a front portion of a vehicle V such as a hybrid car or an electric car to a high-voltage battery 12 disposed at a position rearward relative to the inverter 11 in the vehicle V. The wire harness 10 is routed, for example, under the floor of the vehicle V. For example, the wire harness 10 is routed such that an intermediate portion of the wire harness 10 in the length direction is routed in a space outside the vehicle interior, such as an underfloor portion of the vehicle V.

The inverter 11 is connected to a not-shown wheel driving motor, which serves as a power source for travel of the vehicle. The inverter 11 generates AC power from DC power of the high-voltage battery 12, and supplies the AC power to the motor. The high-voltage battery 12 is a battery that can supply a voltage of several hundreds of volts, for example.

Figure 2:
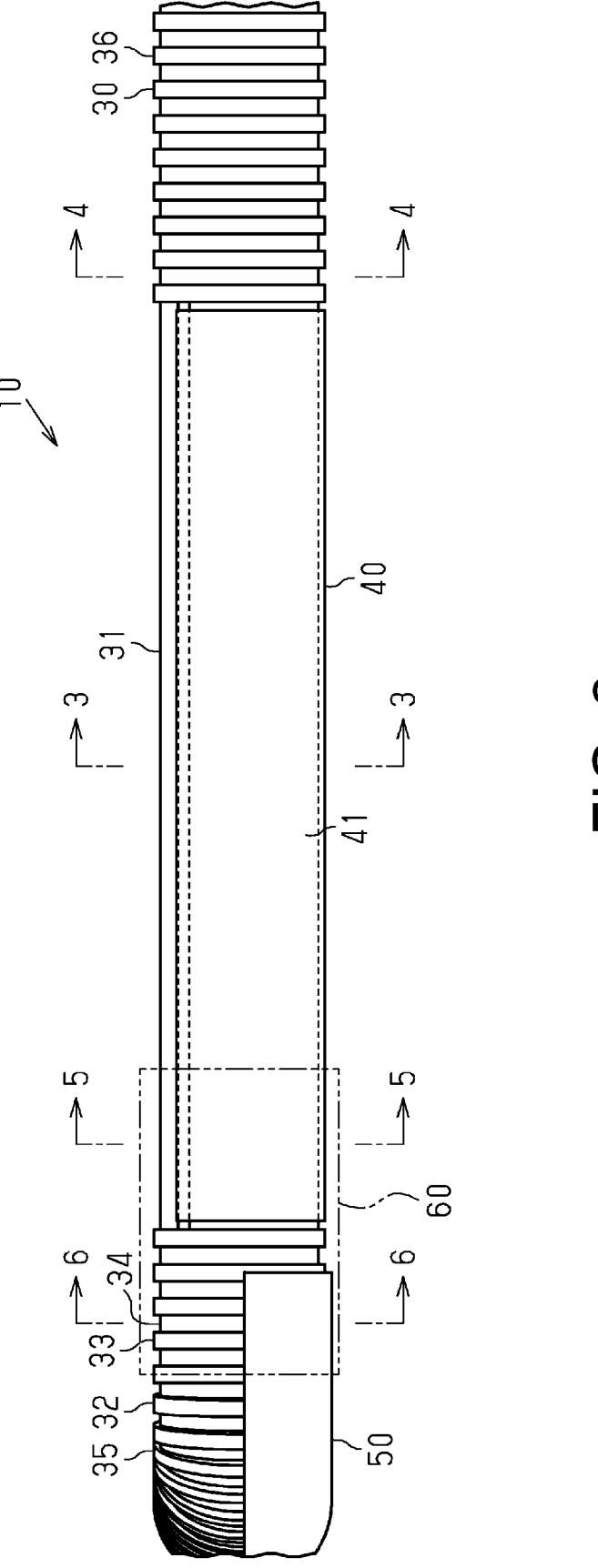
FIG. 2 is a side view illustrating part of the wire harness according to the embodiment.
Figure 3:
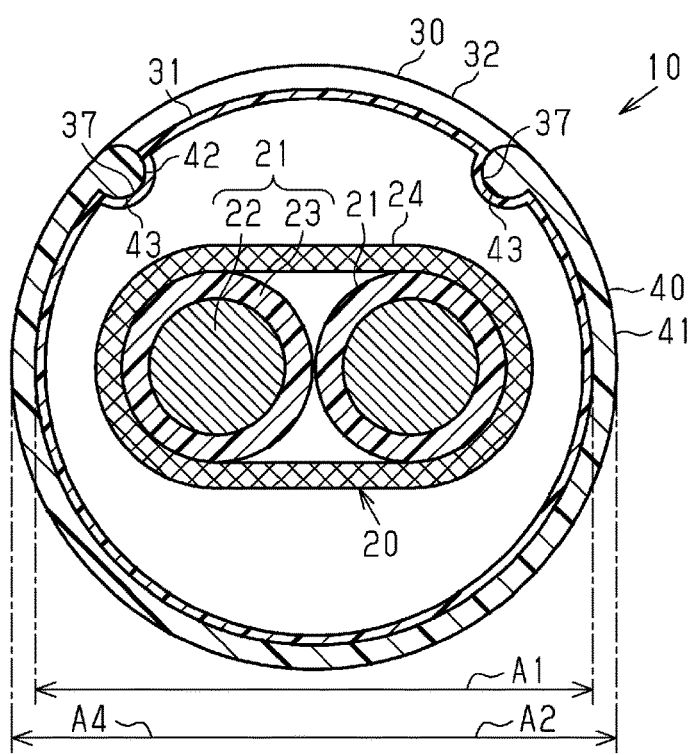
FIG. 3 is a cross-sectional view taken along line 3-3 in FIG. 2.

As shown in FIGS. 1 to 3, the wire harness 10 includes a wire member 20 (wire) for electrically connecting the electrical devices to each other, a tubular exterior member 30 (exterior tube) that covers an outer circumference of the wire member 20, and a route restricting member 40 (route restrictor) that is provided on the outer circumference of the exterior member 30 and restricts part of the route of the exterior member 30.

Also, as shown in FIG. 2, the wire harness 10 of the present embodiment includes a corrugated portion route restricting member 50 (corrugated portion route restrictor) and a coupling member 60 (coupler). As shown in FIG. 1, a pair of connectors C1 and C2 are attached to two ends of the wire member 20.

Configuration of Wire Member 20

As shown in FIG. 3, the wire member 20 includes at least one wire 21, and a braided member 24 that covers the outer circumference of the wire 21 as a whole. The wire member 20 of the present embodiment includes two wires 21. One end portion of the wire member 20 is connected to the inverter 11 via the connector C1, and the other end portion of the wire member 20 is connected to the high-voltage battery 12 via the connector C2. The wire member 20 is, for example, elongated while extending in the front-rear direction of the vehicle. The wire 21 is, for example, a high-voltage wire that can deal with a high voltage and a large current. The wire 21 may be, for example, a non-shielded wire without any electromagnetic shielding structure, or a shielded wire with an electromagnetic shielding structure.

Configuration of Wire Member 21

As shown in FIG. 3, the wires 21 are, for example, coated wires that each include a core wire 22 made of an electrical conductor, and an insulating coating 23 that coats an outer circumference of the core wire 22.

Configuration of Wire Member 22

The core wire 22 may be, for example, a twisted wire obtained by twisting a plurality of metal bar wires together, a columnar conductor made of a single columnar metal rod having a solid internal structure, a tubular conductor having a hollow internal structure, or the like. Also, for example, a combination of a plurality of types of conductors such as a twisted wire, a columnar conductor, and a tubular conductor may be used as the core wire 22. Examples of a columnar conductor may include a single core wire and a bus bar. The core wire 22 of the present embodiment is a twisted wire. As the material of the core wire 22, a metal material such as a copper material or an aluminum material can be used, for example.

The core wire 22 has a suitable cross-sectional shape taken along a plane orthogonal to the length direction of the core wire 22, that is, the length direction of the wire 21 (hereinafter, the cross-sectional shape being referred to as a horizontal cross-sectional shape). The horizontal cross-sectional shape of the core wire 22 is, for example, circular, semi-circular, polygonal, square, flattened, or the like. The horizontal cross-sectional shape of the core wire 22 of the present embodiment is circular.

Configuration of Insulating Coating 23

An insulating coating 23 coats, for example, the entire outer circumferential surface of the core wire 22. The insulating coating 23 is made of an insulating material such as a synthetic resin, for example. For example, a synthetic resin mainly made of a polyolefin series resin such as a cross-linked polyethylene or a cross-linked polypropylene may be used as the material of the insulating coating 23. Also, the insulating coating 23 may be made of one type of material alone, or a combination of at least two types of materials.

Configuration of Braided Member 24

The braided member 24 is tubular such that, for example, the braided member 24 as a whole covers the outer circumference of the wires 21 together. For example, the braided member 24 covers the outer circumference of the wires 21 over substantially the entirety in the length direction of the entire wires 21. The braided member 24 may employ braided wires obtained by knitting a plurality of metal bar wires, or a braided wires obtained by knitting metal bar wires and resin bar wires in combination. The metal bar wires may be made of a metal material such as a copper material or an aluminum material, for example. The braided member 24 is grounded at, for example, the connectors C1 and C2, although illustration is omitted.

Configuration of Exterior Member 30

Figure 4:
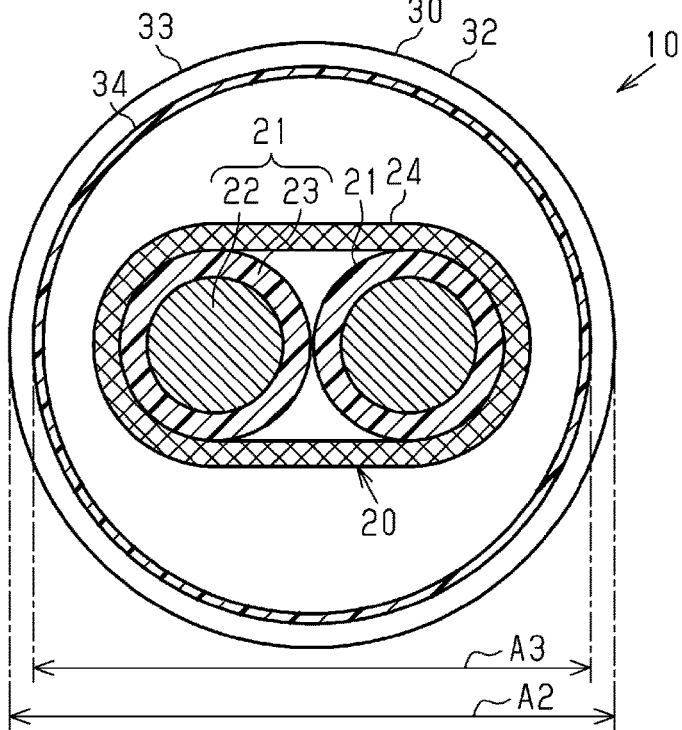
FIG. 4 is a cross-sectional view taken along line 4-4 in FIG. 2.

As shown in FIGS. 3 and 4, the exterior member 30 is tubular such that it covers the outer circumference of the wire member 20 entirely in a circumferential direction. The exterior member 30 is sealed entirely in the circumferential direction. For example, a conductive resin material or a non-conductive resin material may be used as the material of the exterior member 30. The resin material may be a synthetic resin such as, for example, polyolefin, polyamide, polyester, or an ABS resin. As shown in FIG. 2, the exterior member 30 includes a linear portion 31, and a corrugated portion 32 that is continuous from the linear portion 31.

As shown in FIGS. 2 and 4, the corrugated portion 32 has a corrugated structure in which a large-diameter portion 33 and a small-diameter portion 34 are alternately and sequentially provided in a length direction of the corrugated portion 32. The corrugated portion 32 is superior in bendability to the linear portion 31. The corrugated portion 32 of the present embodiment includes a first corrugated portion 35 and a second corrugated portion 36 that are provided at the respective ends of the linear portion 31. That is to say, in the exterior member 30 of the present embodiment, the first corrugated portion 35, the linear portion 31, and the second corrugated portion 36 are provided sequentially in this order in the length direction. The linear portion 31 is set so as to correspond to a portion of the wiring route of the wire member 20, such as an underfloor portion of the vehicle V where the exterior member 30 extends linearly.

As shown in FIG. 3, the linear portion 31 has a constant diameter in the length direction thereof. The linear portion 31 has an outer diameter A1 that is smaller than an outer diameter A2 of the corrugated portion 32. Note that the outer diameter A2 of the corrugated portion 32 corresponds to the outer diameter A2 of the large-diameter portion 33. In the present embodiment, the outer diameter A1 of the linear portion 31 is set to the same value as that of an outer diameter A3 (see FIG. 4) of the small-diameter portion 34 of the corrugated portion 32.

As shown in FIG. 3, the linear portion 31 includes recesses 37. The recesses 37 are recessed inward in the radial direction. Two recesses 37 are provided in the circumferential direction of the linear portion 31. The recesses 37 extend in the length direction of the linear portion 31. The recesses 37 are provided over the entire length of the linear portion 31 in the length direction. The recesses 37 are arc-shaped when viewed in the length direction of the linear portion 31.

Configuration of Route Restricting Member 40

The route restricting member 40 is made of a resin. For example, a synthetic resin such as polypropylene, polyamide, or polyacetal may be used as the material of the route restricting member 40. The route restricting member 40 can be manufactured by a well-known manufacturing method such as extrusion molding or injection molding, for example. The route restricting member 40 of the present embodiment has a uniform cross-sectional shape when viewed in the length direction. The route restricting member 40 is an extrusion molded article.

As shown in FIG. 3, the route restricting member 40 includes a body portion 41 (body) and an insertion hole 42. The body portion 41 covers part of the exterior member 30 in the circumferential direction, out of the outer circumference of the exterior member 30. The insertion hole 42 is formed by two ends of the body portion 41 in the circumferential direction, and extends in the length direction of the route restricting member 40 over the entire length of the route restricting member 40. The insertion hole 42 is an opening into which the exterior member 30 is insertable. The body portion 41 is major arc-shaped when viewed in the length direction. That is, when a virtual circle is divided at two points into two portions, the body portion 41 is the portion whose circumference is larger than one half of the entire circumference of the virtual circle.

As shown in FIGS. 2 and 3, the route restricting member 40 is attached to the linear portion 31 of the exterior member 30. The route restricting member 40 has a length that is shorter than the length of the linear portion 31. Also, the route restricting member 40 is attached, over the entire length thereof, to the linear portion 31.

As shown in FIG. 3, the route restricting member 40 has projections 43 that respectively project toward the exterior member 30 from the inner surfaces at the two ends of the body portion 41 in the circumferential direction, and are in contact with the outer surface of the exterior member 30. The projections 43 are arc-shaped when viewed in the length direction of the route restricting member 40. The projections 43 extend over the entire length of the route restricting member 40 in the length direction of the route restricting member 40. Also, the projections 43 are fitted into the recesses 37 in the linear portion 31. As described above, the route restricting member 40 attached to the linear portion 31 has an outer diameter A4 that is smaller than or equal to the outer diameter A2 of the corrugated portion 32. In the present embodiment, the outer diameter A4 of the route restricting member 40 attached to the linear portion 31 is set to the same value as that of the outer diameter A2 of the corrugated portion 32.

The opening width of the insertion hole 42 is smaller than the outer diameter Al of the linear portion 31. Also, when inserting the linear portion 31 of the exterior member 30 into the insertion hole 42 in a direction orthogonal to the length direction, the route restricting member 40 elastically deforms and the opening width of the insertion hole 42 is enlarged. When the linear portion 31 of the exterior member 30 has been inserted into the route restricting member 40, the route restricting member 40 elastically recovers to the original shape. With this, the opening width becomes smaller than the outer diameter Al of the linear portion 31, and the projections 43 are fitted into the recesses 37, resulting in attachment of the route restricting member 40 to the exterior member 30.

Configuration of Corrugated Portion Route Restricting Member 50

Figure 6:
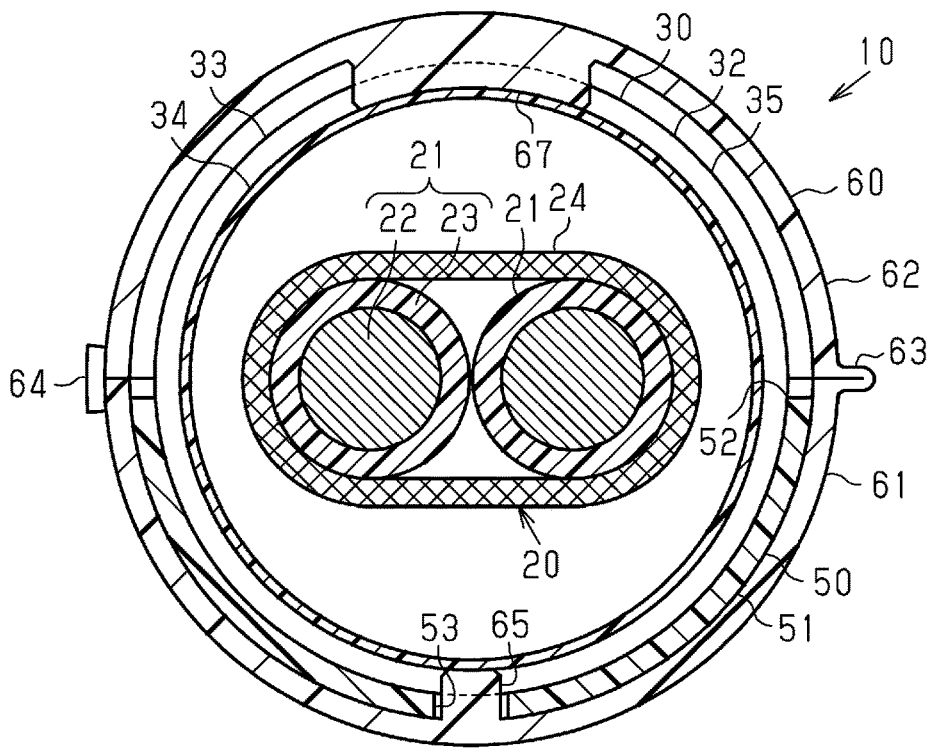
FIG. 6 is a cross-sectional view taken along line 6-6 in FIG. 2.

The corrugated portion route restricting member 50 is made of a resin. For example, a synthetic resin such as polypropylene, polyamide, or polyacetal may be used as the material of the corrugated portion route restricting member 50. The corrugated portion route restricting member 50 can be manufactured by a well-known manufacturing method such as extrusion molding or injection molding, for example. The corrugated portion route restricting member 50 of the present embodiment is molded using, for example, a pair of upper and lower metal molds As shown in FIGS. 2 and 6, the corrugated portion route restricting member 50 is attached to the outer circumference of the corrugated portion 32, and restricts the route of the corrugated portion 32. In the present embodiment, the corrugated portion route restricting member 50 is attached to the outer circumference of the first corrugated portion 35 and restricts the route of the first corrugated portion 35. The first corrugated portion 35 is bent in the paper rear direction of FIG. 2, and the corrugated portion route restricting member 50 restricts the route of the bent first corrugated portion 35.

As shown in FIG. 6, the corrugated portion route restricting member 50 includes a restriction body portion 51 and a restriction insertion hole 52. The restriction body portion 51 covers part of the corrugated portion 32 in the circumferential direction, out of the outer circumference of the corrugated portion 32. The restriction insertion hole 52 is formed by two ends of the restriction body portion 51 in the circumferential direction, and extends in the length direction of the corrugated portion route restricting member 50 over the entire length of the corrugated portion route restricting member 50. The restriction insertion hole 52 is an opening into which the corrugated portion 32 is insertable. The restriction body portion 51 is minor arc-shaped when viewed in the length direction. That is, when a virtual circle is divided at two points into two portions, the restriction body portion 51 is the portion whose circumference is smaller than one half of the entire circumference of the virtual circle. The restriction body portion 51 is bent in a direction (the paper rear direction in FIG. 2) in which the corrugated portion 32 is bent when viewed in the opening direction of the restriction insertion hole 52.

As shown in FIG. 6, the corrugated portion route restricting member 50 includes a first engagement portion 53 (first engagement), which is a recess formed in the exterior member 30 in the radial direction. The first engagement portion 53 of the present embodiment is a through hole that penetrates the restriction body portion 51.

Configuration of Coupling Member 60

The coupling member 60 is made of a resin. For example, a synthetic resin such as polypropylene, polyamide, or polyacetal may be used as the material of the coupling member 60. The coupling member 60 can be manufactured by a well-known manufacturing method such as extrusion molding or injection molding, for example. The coupling member 60 of the present embodiment is molded using, for example, a pair of upper and lower metal molds.

Figure 5:
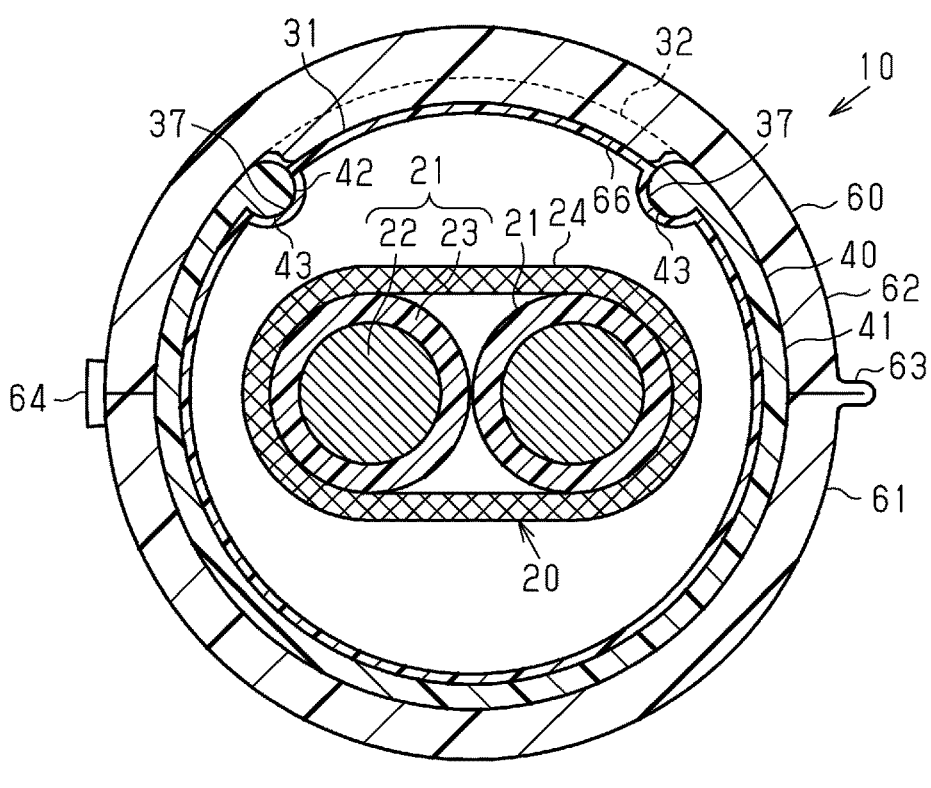
FIG. 5 is a cross-sectional view taken along line 5-5 in FIG. 2.

As shown in FIGS. 2, 5 and 6, the coupling member 60 is annular surrounding the outer circumference of the exterior member 30, and extends over the boundary between the linear portion 31 and the corrugated portion 32. In the present embodiment, the coupling member 60 extends over the boundary between the linear portion 31 and the first corrugated portion 35. Also, the coupling member 60 surrounds the outer circumference of the exterior member 30 and the outer circumference of the corrugated portion route restricting member 50, and couples the exterior member 30 to the corrugated portion route restricting member 50. Also, the coupling member 60 extends over the space between the route restricting member 40 and the corrugated portion route restricting member 50, and surrounds the outer circumference of the route restricting member 40.

As shown in FIGS. 5 and 6, the coupling member 60 of the present embodiment includes a first coupling part 61 and a second coupling part 62 that respectively have shapes obtained by dividing a circle into two portions when viewed in the length direction. When viewed in the length direction of the coupling portion 60, one end of the first coupling part 61 in the circumferential direction, and one end of the second coupling part 62 in the circumferential direction are coupled to each other via a thin-walled hinge part 63. Also, the other end of the first coupling part 61 in the circumferential direction, and the other end of the second coupling part 62 in the circumferential direction have a fitting part 64 such as, e.g., a snap-fit part, and are detachable using the fitting part 64. With this, the coupling member 60 is retrofittable to the outer circumference of the exterior member 30, the route restricting member 40, and the corrugated portion route restricting member 50.

As shown in FIG. 6, the coupling member 60 includes a second engagement portion 65 (second engagement). The second engagement portion 65 protrudes from the first coupling part 61 inward in the radial direction, and engages with the first engagement portion 53 of the corrugated portion route restricting member 50 in a manner of recess/protrusion engagement. With this, the coupling member 60 is suppressed from rotating in the circumferential direction with respect to the corrugated portion route restricting member 50. Also, the coupling member 60 is suppressed from moving in the length direction with respect to the corrugated portion route restricting member 50.

As shown in FIG. 5, the coupling member 60 includes a protrusion 66. The protrusion 66 protrudes from the second coupling part 62 toward the insertion hole 42 in the route restricting member 40, that is, inward in the radial direction, and is located inside the insertion hole 42. With this, the coupling member 60 is suppressed from rotating in the circumferential direction with respect to the route restricting member 40. With this, the coupling member 60 suppresses the corrugated portion route restricting member 50 from rotating in the circumferential direction with respect to the route restricting member 40.

Also, as shown in FIG. 6, the coupling member 60 includes a longitudinal engagement portion 67. The longitudinal engagement portion 67 protrudes from the second coupling part 62 inward in the radial direction, and is fitted between the large-diameter portions 33 of the corrugated portion 32. With this, the coupling member 60 is suppressed from moving in the length direction with respect to the corrugated portion 32.

The following will describe functions of the present embodiment.

According to the wire harness 10 of the present embodiment, non-bendability of the linear portion 31 in a linear state is complemented with the route restricting member 40, and the linear portion 31 is prevented from being suspended when the wire harness 10 is attached to the underfloor portion or the like of the vehicle V, for example. Also, when installing the corrugated portion 32 in the vehicle V, an operator can suitably bend the corrugated portion 32, and install the bent corrugated portion 32 in the vehicle V. Also, the corrugated portion 32 is maintained as being bent at a position at which the corrugated portion route restricting member 50 is attached, and a change in the bent state of the corrugated portion 32 is prevented.

The following will describe effects of the present embodiment.

(1) Since the exterior member 30 includes the linear portion 31, and the corrugated portion 32 that is continuous from the linear portion 31 and is superior in bendability to the linear portion 31, the exterior member 30 is unlikely to bend at the linear portion 31, and is likely to bend at the corrugated portion 32. Also, since the route restricting member 40 is attached to the linear portion 31, non-bendability of the linear portion 31 is complemented even when the exterior member 30 is made thin in view of the bendability of the corrugated portion 32, and sufficient route restriction in the linear portion 31 can be achieved. In this configuration, it is possible to achieve a reduction in thickness of the route restricting member 40 and realize sufficient route restriction at the same time, compared to a case where the route restricting member 40 is attached to a corrugated tube whose entire shape is corrugated, for example. Also, in a configuration in which no route restricting member 40 is provided and a linear portion 31 with enhanced rigidity is used to achieve sufficient route restriction, there is a risk that the corrugated portion 32 is unlikely to bend or likely to be damaged. However, the above-described configuration can avoid such a situation and ensure the bendability of the corrugated portion 32. With this, it is possible to realize both favorable route restriction and bendability.

(2) Since the outer diameter A1 of the linear portion 31 is smaller than the outer diameter A2 of the corrugated portion 32, it is possible to reduce the outer diameter of the portion to which the route restricting member 40 is attached, compared with a case where the outer diameter A1 of the linear portion 31 is greater than or equal to the outer diameter A2 of the corrugated portion 32.

(3) Since the route restricting member 40 has a length that is shorter than a length of the linear portion 31, it is possible to attach the route restricting member 40 over its entire length to the linear portion 31.

(4) Since the outer diameter A4 of the route restricting member 40 attached to the linear portion 31 is smaller than or equal to the outer diameter A2 of the corrugated portion 32, the portion to which the route restricting member 40 is attached is prevented from protruding from the corrugated portion 32 in the radial direction.

(5) Since the body portion 41 of the route restricting member 40 is major arc-shaped, it is possible to retrofit the route restricting member 40 to the outer circumference of the exterior member 30 via the insertion hole 42, without using any fixation member such as tape, for example.

(6) Since the route restricting member 40 has projections 43 that respectively project toward the exterior member 30 from inner surfaces of the two ends of the body portion 41 in the circumferential direction, and are in contact with an outer surface of the exterior member 30, it is possible to prevent the route restricting member 40 from being removed from the exterior member 30 via the insertion hole 42.

(7) Since the linear portion 31 has a recess 37 into which each of the projections 43 is fitted, it is possible to prevent more efficiently the route restricting member 40 from being removed from the exterior member 30 via the insertion hole 42. Also, it is possible to restrict the route restricting member 40 from rotating in the circumferential direction with respect to the linear portion 31. Also, it is possible to reduce the outer diameter of the portion to which the route restricting member 40 is attached. Also, the linear portion 31 is less likely to bend, compared with a configuration in which no recess 37 is provided.

(8) Since two recesses 37 are provided, it is possible to bring the projections 43 at the two ends of the body portion 41 in the circumferential direction into a state of being fitted into the respective recesses 37. Accordingly, it is possible to suppress the route restricting member 40 from being removed from the exterior member 30 via the insertion hole 42 more efficiently than in a case where one recess 37 is provided. With this, it is possible to further suppress the route restricting member 40 from rotating in the circumferential direction with respect to the linear portion 31. Also, it is possible to further reduce the outer diameter of the portion to which the route restricting member 40 is attached. Also, the linear portion 31 is much less likely to bend.

(9) Since the coupling member 60 is provided that is annular surrounding the outer circumference of the exterior member 30, and extends the boundary between the linear portion 31 and the corrugated portion 32, it is possible to prevent a bend at the boundary between the linear portion 31 and the corrugated portion 32. That is to say, there is a risk that a bend occurs at the boundary between the linear portion 31 and the corrugated portion 32 due to a change in the structure, but such a bend is prevented by the coupling member 60.

(10) Since the corrugated portion route restricting member 50 is provided that is attached to the outer circumference of the corrugated portion 32 and restricts the route of the corrugated portion 32, the route of the corrugated portion 32 is restricted. The coupling member 60 surrounds the outer circumference of the exterior member 30 and the corrugated portion route restricting member 50, and couples the exterior member 30 to the corrugated portion route restricting member 50. Accordingly, the coupling member 60 is a member that fixes the corrugated portion route restricting member 50 to the exterior member 30, and serves at the same time as a member that prevents a bend at the boundary between the linear portion 31 and the corrugated portion 32.

(11) Since the coupling member 60 extends over the space between the route restricting member 40 and the corrugated portion route restricting member 50, and surrounds the outer circumference of the route restricting member 40, the exterior member 30 is suppressed from bending at a position between the route restricting member 40 and the corrugated portion route restricting member 50.

(12) The coupling member 60 includes: the second engagement portion 65 that engages with the first engagement portion 53 of the corrugated portion route restricting member 50 in a manner of recess/protrusion engagement, and the protrusion 66 that is located inside the insertion hole 42 of the route restricting member 40. Accordingly, the corrugated portion route restricting member 50 can be prevented from rotating in the circumferential direction with respect to the route restricting member 40.

Modifications

The present embodiment can be executed in the following modifications. The present embodiment and the following modifications can be executed in combinations in a range in which they do not technically contradict each other.

In the above-described embodiment, the number of the recesses 37 is two that is the same as the number of the projections 43, but the present disclosure is not limited to this, and a different number of recesses 37 may be provided. That is, the number of the recesses 37 may be three or more, or one recess 37 may be provided. Alternatively, a linear portion 31 without any recess 37 may also be provided.

Figure 7:
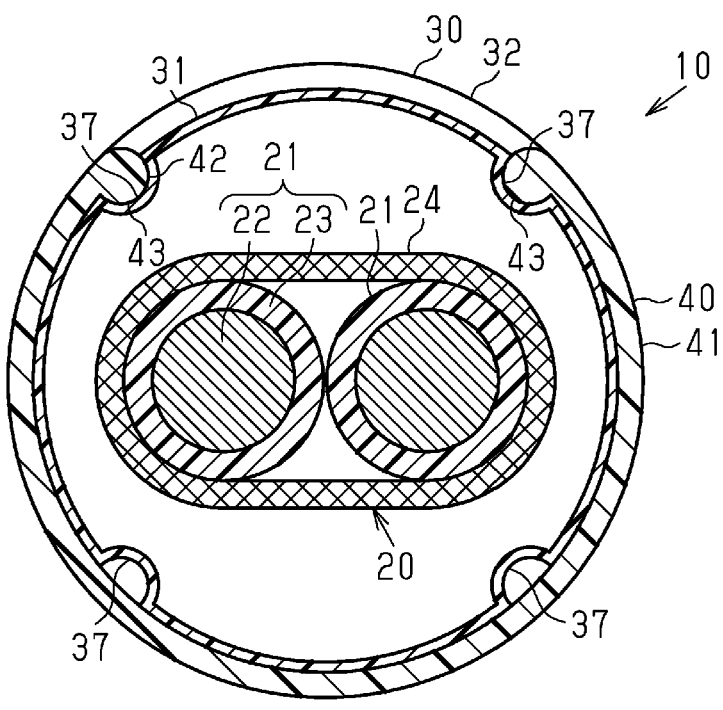
FIG. 7 is a cross-sectional view illustrating a wire harness according to another embodiment.

Specifically, as shown in FIG. 7 for example, a configuration is also possible in which four recesses 37 are provided. In this example, the four recesses 37 are provided at equal interval in the circumferential direction of the linear portion 31. With this, it is possible to change the position in the circumferential direction at which the route restricting member 40 is attached to the linear portion 31. That is, in FIG. 7, the route restricting member 40 is attached so that the insertion hole 42 is directed upward, but the route restricting member 40 may also be attached so that the insertion hole 42 is directed rightward, leftward, or downward. Also, the linear portion 31 is much less likely to bend, compared with a configuration in which at most two recesses 37 are provided.

Figure 8:
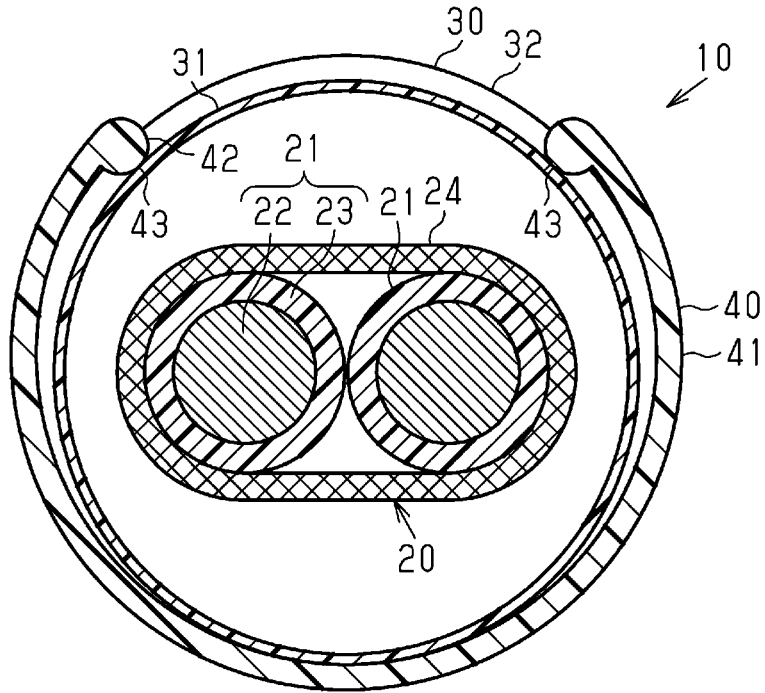
FIG. 8 is a cross-sectional view illustrating a wire harness according to yet another embodiment.

Also, as shown in FIG. 8 for example, a linear portion 31 without any recess 37 may also be provided.

In the above-described embodiment, the body portion 41 of the route restricting member 40 is major arc-shaped, but the present disclosure is not limited to this, and the body portion 41 may have another shape.

Figure 9:
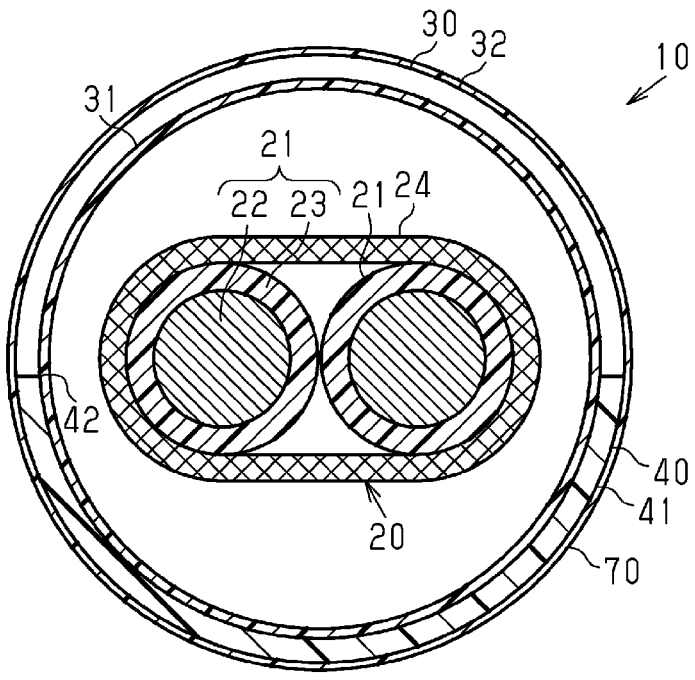
FIG. 9 is a cross-sectional view illustrating a wire harness according to yet another embodiment.

For example, as shown in FIG. 9, the body portion 41 of the route restricting member 40 may be minor arc-shaped. The route restricting member 40 of this example does not have any projection 43. Also, the route restricting member 40 is fixed to the linear portion 31 by being wound together with the linear portion 31 by tape 70. With this, the shape of the route restricting member 40 is simplified.

In the above-described embodiment, the outer diameter A1 of the linear portion 31 is smaller than the outer diameter A2 of the corrugated portion 32, but the present disclosure is not limited to this, and the outer diameter A1 of the linear portion 31 may be greater than or equal to the outer diameter A2 of the corrugated portion 32. Also, in the above-described embodiment, the outer diameter A1 of the linear portion 31 is equal to the outer diameter A3 of the small-diameter portion 34 of the corrugated portion 32, but the present disclosure is not limited to this, and a configuration is also possible in which the outer diameter A1 of the linear portion 31 is smaller than the outer diameter A2 of the large-diameter portion 33 of the corrugated portion 32, and is greater than the outer diameter A3 of the small-diameter portion 34.

In the above-described embodiment, the length of the route restricting member 40 is shorter than the length of the linear portion 31, but the present disclosure is not limited to this, and the length of the route restricting member 40 may be greater than or equal to the length of the linear portion 31. Note that when, for example, the length of the route restricting member 40 is greater than the length of the linear portion 31, part of the route restricting member 40 may cover part of the corrugated portion 32 in the circumferential direction.

In the above-described embodiment, the outer diameter A4 of the route restricting member 40 attached to the linear portion 31 is smaller than or equal to the outer diameter A2 of the corrugated portion 32, but the present disclosure is not limited to this, and the outer diameter A4 of the route restricting member 40 may be greater than the outer diameter A2 of the corrugated portion 32.

In the present embodiment, the coupling member 60 is provided that extends over the boundary between the linear portion 31 and the corrugated portion 32, but the present disclosure is not limited to this, and a configuration is also possible in which no coupling member 60 is provided.

In the above-described embodiment, the corrugated portion route restricting member 50 is provided that is attached to the outer circumference of the corrugated portion 32 and restricts the route of the corrugated portion 32, but the present disclosure is not limited to this, and a configuration is also possible in which no corrugated portion route restricting member 50 is provided.

In the above-described embodiment, the coupling member 60 extends over the space between the route restricting member 40 and the corrugated portion route restricting member 50, but the present disclosure is not limited to this, and a configuration is also possible in which the coupling member 60 does not extend to the route restricting member 40.

In the above-described embodiment, the second engagement portion 65 of the coupling member 60 engages with the first engagement portion 53 of the corrugated portion route restricting member 50 in a manner of recess/protrusion engagement, but the present disclosure is not limited to this, and a configuration is also possible in which none of the first engagement portion 53 and the second engagement portion 65 is provided. Also, in the above-described embodiment, the first engagement portion 53 is a through hole that penetrates the restriction body portion 51, but the first engagement portion 53 may also be a recess that does not penetrate the restriction body portion 51. Also, a configuration is possible in which the first engagement portion 53 of the corrugated portion route restricting member 50 is a protrusion protruding in the radial direction, and the second engagement portion 65 of the coupling member 60 is a recess into which the first engagement portion 53 is fitted in a manner of recess/protrusion engagement In the above-described embodiment, the coupling member 60 includes the protrusion 66 located inside the insertion hole 42 in the route restricting member 40, but the present disclosure is not limited to this, and a configuration is also possible in which no protrusion 66 is provided.

In the above-described embodiment, the coupling member 60 includes the first coupling part 61 and the second coupling part 62, which are coupled to each other via the hinge part 63, but the present disclosure is not limited to this, and a configuration is also possible in which the first coupling part 61 and the second coupling part 62 are separate parts. Note that, of course, even when the first coupling part 61 and the second coupling part 62 of the coupling member 60 are separate parts, it is necessary to form the first coupling part 61 and the second coupling part 62 that can be fixed to each other to form a ring shape.

The route restricting member 40 and the corrugated portion route restricting member 50 may also be made of metal. For example, the route restricting member 40 may be made of a metal material such as an iron material, a copper material, or an aluminum material. With this measure, if, for example, the route restricting member 40 is disposed at a position near a heat source of the vehicle, it is possible to suppress an increase in the temperature inside the exterior member 30, that is, the temperature of the wire member 20.

The wire member 20 may include one wire 21, or three or more wires 21.

It is also possible that the wire member 20 does not include any braided member 24.

The wire harness 10 may include a plurality of route restricting members 40 provided at intervals to each other in the length direction of the exterior member 30.

The route restricting member 40 is not limited to being provided under the floor of the vehicle V. The route restricting member 40 may also be provided, for example, in the vehicle interior of the vehicle V as long as it is used for a linear portion of the wiring route of the wire member 20.

As shown in FIG. 5, the protrusion 66 of the coupling member 60 may also be inserted between two ends of the body portion 41 in the circumferential direction, that is, into the insertion hole 42, so that any gap in the circumferential direction is substantially formed between the two ends.

As shown in FIG. 2, the range in the length direction in which the coupling member 60 covers the route restricting member 40, and the range in the length direction in which the coupling member 60 covers the corrugated portion route restricting member 50 may be larger than the gap between the route restricting member 40 and the corrugated portion route restricting member 50 in the length direction.

As shown in FIG. 2, the length of the route restricting member 40 may also be substantially equal to the length of the linear portion 31. The gap between the large-diameter portion 33 of the first corrugated portion 35 that is the closest to the linear portion 31, and one end of the route restricting member 40 in the length direction may also be smaller than or equal to the length of the large-diameter portion 33 or the small-diameter portion 34. The gap between the large-diameter portion 33 of the second corrugated portion 36 that is the closest to the linear portion 31, and the other end of the route restricting member 40 in the length direction may also be smaller than or equal to the length of the large-diameter portion 33 or the small-diameter portion 34 in the length direction. Note that the length of the large-diameter portion 33 in the length direction and the length of the small-diameter portion 34 in the length direction may also be substantially equal to each other.

As shown in FIGS. 2 and 5, the coupling member 60 may cover the outer circumference of the exterior member 30 so that the route restricting member 40 is interposed between the coupling member 60 and the exterior member 30. As shown in FIGS. 2 and 6, the coupling member 60 may also cover the outer circumference of the exterior member 30 so that the corrugated portion route restricting member 50 is interposed between the coupling member 60 and the exterior member 30.

As shown in FIGS. 3 and 5, the entire inner surface of the body portion 41 of the route restricting member 40 may be in intimate contact with the outer surface of the linear portion 31 of the exterior member 30, and the entire surface of the projection 43 may be in intimate contact with the inner surface of the recess 37. The body portion 41 may cover the outer circumference of the exterior member 30 over a range larger than 180 degrees. As shown in FIG. 5, the outer surface of the body portion 41 of the route restricting member 40 may be in intimate contact with the inner surface of the coupling member 60.

As shown in FIG. 6, the inner surface of the restriction body portion 51 of the corrugated portion route restricting member 50 may be in intimate contact with the outer surface of the large-diameter portion 33 of the corrugated portion 32. The restriction body portion 51 may cover the outer circumference of the exterior member 30 over a range smaller than 180 degrees. The outer surface of the restriction body portion 51 of the corrugated portion route restricting member 50 may be in intimate contact with the inner surface of the coupling member 60.

As shown in FIGS. 3 and 5, when viewed in the length direction of the route restricting member 40, the leading end faces of two ends of the body portion 41 in the circumferential direction may be arc-shaped and may be smoothly continuous from the surfaces of the projections 43. In other words, when viewed in the length direction of the route restricting member 40, the two ends of the body portion 41 in the circumferential direction, and the corresponding projections 43 may respectively have arc-shaped surfaces extending on the same circumference.

As shown in FIGS. 2 and 3, the insertion hole 42 is a first groove that extends in the length direction of the route restricting member 40 and extends linearly over the entire length of the route restricting member 40, and the first groove may be open at both ends of the route restricting member 40 in the length direction. The route restricting member 40 may be referred to as a first restriction member that restricts the route of the linear portion 31 of the exterior member 30, and the insertion hole 42 may be referred to as a first insertion hole. Also, the route restricting member 40 may be referred to as a linear route restricting member or a non-corrugated portion route restricting member.

As shown in FIGS. 2 and 6, the restriction insertion hole 52 is a second groove that extends in the length direction of the corrugated portion route restricting member 50 and extends linearly over the entire length of the corrugated portion route restricting member 50, and the second groove may be open at both ends of the corrugated portion route restricting member 50 in the length direction. The corrugated portion route restricting member 50 may be referred to as a second restriction member that restricts the route of the corrugated portion 32 of the exterior member 30, and the restriction insertion hole 52 may be referred to as a second insertion hole.

The linear portion 31 of the exterior member 30 may be referred to as a linear portion without corrugation or a non-corrugated portion.

As shown in FIGS. 2 and 3, the recesses 37 in the exterior member 30 may be provided only in the linear portion 31 of the exterior member 30, and the corrugated portion 32 does not necessarily have the recesses 37 into which the projections 43 of the route restricting member 40 are fitted in a manner of recess/protrusion engagement. The recess/protrusion engagement between the projections 43 of the route restricting member 40 and the recesses 37 in the exterior member 30 may be referred to as a rotation stopper that prevents the route restricting member 40 from moving in the circumferential direction of the linear portion 31 of the exterior member 30.

As shown in FIG. 2, the linear portion 31 of the exterior member 30 may be formed between two corrugated portions 32 provided apart from each other in the length direction. Of the large-diameter portions 33 of the two corrugated portions 32 with the linear portion 31 interposed therebetween, the large-diameter portion 33 that is the closest to the linear portion 31 may face an end face of the route restricting member 40 in the length direction. The large-diameter portion 33 that is the closest to the linear portion 31 may be referred to as a slide stopper that comes into contact with the end face of the route restricting member 40 in the length direction, and restricts the sliding length (play) of the route restricting member 40 with respect to the linear portion 31 in the length direction.

The present disclosure includes the following implementation examples. Reference numerals of some constituent components of an exemplary embodiment are given not for restrictive reasons but for helping understanding. Some of the items described in the following implementation examples may be omitted, or some of the items described in the following implementation examples may be selected or extracted so as to be combined with each other.

[Appendix 1] In an aspect of the present disclosure, a range in the length direction in which the coupling member (60) covers the route restricting member (40), and a range in the length direction in which the coupling member (60) covers the corrugated portion route restricting member (50) may be larger than a gap between the route restricting member (40) and the corrugated portion route restricting member (50) in the length direction.

[Appendix 2] In an aspect of the present disclosure, the corrugated portion (32) may include a plurality of large-diameter portions (33) and a plurality of small-diameter portions (34), which are alternately provided in the length direction thereof, > wherein the exterior member (30) includes a first corrugated portion (35), which is the corrugated portion (32) continuous from one end of the linear portion (31) in the length direction, and a second corrugated portion (36), which is the corrugated portion (32) continuous from the other end of the linear portion (31) in the length direction,
>
> an outer diameter (A1) of the linear portion (31) is equal to an outer diameter (A3) of the small-diameter portion,
>
> a gap between the large-diameter portion (33) of the first corrugated portion (35) that is the closest to the linear portion (31), and one end of the route restricting member (40) in the length direction is smaller than or equal to the length of the large-diameter portion (33) or the small-diameter portion (34) in the length direction, and
>
> a gap between the large-diameter portion (33) of the second corrugated portion (36) that is the closest to the linear portion (31), and the other end of the route restricting member (40) in the length direction is smaller than or equal to the length of the large-diameter portion (33) or the small-diameter portion (34) in the length direction.

The invention claimed is:

1. A wire harness comprising:
a wire;
an exterior tube that is tubular and covers an outer circumference of the wire;
a route restrictor that is attached to an outer circumference of the exterior tube, and is configured to restrict a route of the exterior tube, wherein:
> the exterior tube includes a linear portion, and a corrugated portion that is continuous from the linear portion,
> the corrugated portion has a higher bendability than the linear portion,
> the route restrictor includes:
>> a body that covers part of an outer circumference of the exterior tube in a circumferential direction of the wire; and
>> an insertion hole that is formed by two ends of the body in the circumferential direction of the wire, and extends in a length direction of the route restrictor over an entire length of the route restrictor, the insertion hole being an opening into which the exterior tube is insertable, and
> the route restrictor is attached to the linear portion;
a coupler that is annular surrounding the outer circumference of the exterior tube, and extends over a boundary between the linear portion and the corrugated portion, the coupler extending over an end portion of the route restrictor and covering an end of the linear portion;
a corrugated portion route restrictor that is attached to an outer circumference of the corrugated portion, and is configured to restrict a route of the corrugated portion,
> wherein the coupler covers the outer circumference of the exterior tube and an outer circumference of the corrugated portion route restrictor, and couples the exterior tube to the corrugated portion route restrictor, and
> wherein the coupler extends over a space between the route restrictor and the corrugated portion route restrictor, and surrounds an outer circumference of the route restrictor.

2. The wire harness according to claim 1,
wherein the linear portion has an outer diameter that is smaller than an outer diameter of the corrugated portion.

3. The wire harness according to claim 2,
wherein the route restrictor has a length that is shorter than a length of the linear portion.

4. The wire harness according to claim 3,
wherein the route restrictor attached to the linear portion has an outer diameter that is smaller than or equal to the outer diameter of the corrugated portion.

5. The wire harness according to claim 1,
wherein the body is major arc-shaped.

6. The wire harness according to claim 5,
wherein the route restrictor has projections that respectively project toward the exterior tube from inner surfaces of the two ends of the body in the circumferential direction of the wire, and are in contact with an outer surface of the exterior tube.

7. The wire harness according to claim 6,
wherein the linear portion has at least one recess, each of the projections fitted into a respective one of the at least one recess.

8. The wire harness according to claim 7,
wherein two of the recesses are provided.

9. The wire harness according to claim 7,
wherein three or more of the recesses are provided.

10. The wire harness according to claim 1,
wherein the body is minor arc-shaped.

11. The wire harness according to claim 1, wherein:
the corrugated portion route restrictor includes a first engagement, which is a protrusion protruding in a radial direction of the exterior tube or a recess formed in the exterior tube in the radial direction, and
the coupler includes: a second engagement that engages with the first engagement in a manner of recess/protrusion engagement; and a protrusion that protrudes toward the insertion hole and is located inside the insertion hole.

* * * * *